Patented Aug. 9, 1938

2,126,233

UNITED STATES PATENT OFFICE 2,126,233

LUMINESCENT COMPOSITION AND METHOD OF MAKING THE SAME

Alfred Wakenhut, Seelze, near Hanover, Germany, assignor to J. D. Riedel-E. de Haën A.-G., Berlin-Britz, Germany No Drawing. Application July 17, 1934, Serial No. 735,721. In Germany July 22, 1933

5 Claims. (Cl. 134—47)

My invention relates to luminescent products or compositions adapted for use in the conversion of invisible (electrical) radiation into visible light and more especially to the rendering visible of electrically transmitted images in television devices.

The invention is particularly concerned with mixtures of the sulfides of zinc and cadmium, which have hitherto proven to be particularly suitable for the purposes in view, more especially if activated by means of a metal such as for instance copper or silver.

In contradistinction to preparations of zinc and cadmium sulfide containing copper as an activator similar preparations activated by the presence of silver showed a shifting of the centre of luminescence towards the violet end of the spectrum, whereby zinc sulfide showed a vigorous blue luminescence, while mixtures of zinc sulfide and cadmium sulfide varied from a greenish blue to green, the coloring changing to yellow and even red, if the mixture was particularly rich in cadmium sulfide.

Now blue and green tints are not suitable for producing images for television, since such tints impart to the images a strange discoloration and further exert a very tiring effect on the eyes of the spectators. The most suitable coloring of the images would be a yellowish white tint similar to sunlight.

I have now found that if instead of using either copper or silver as an activator for the sulfide mixture, I incorporate in this mixture both silver and copper, I obtain a luminescence closely resembling sunlight. I have further found that this mixture will go on spreading light long enough to substantially suppress the flickering or scintillating effect of the television images, which is known to arise in many cases.

I am now in a position to produce luminescent or fluorescent compositions, which answer all requirements regarding correct tints, strong excitability and great stability. This latter property may be due to the fact that in view of the activation with both copper and silver I require relatively low additions (mostly below 30%) of cadminum sulfide, while, if the mixture of sulfides is activated with silver exclusively, in order to obtain at least a yellow tint, a relatively high percentage of cadmium sulfide was required, which greatly reduces the stability of the composition if acted upon by cathode rays.

The activating substances (copper and silver) are embedded in the structure of the sulfide crystals.

It is well known that luminescent or fluorescent compositions, such as here in question, consist of the basic substance, which in the present case is a mixture of the sulfides of zinc and cadmium, of the activating heavy metal (in the present case a mixture of silver and copper) and of a flux such as the chloride of an alkali or alkaline earth metal. The mixture of these three substances is heated to a suitable temperature to cause it to crystallize, since crystallization is an indispensable factor. In the case of zinc and cadmium sulfide mixtures the flux may be subsequently removed by washing. The preparation, when ready for use, consists in a crystallized mixture or mixed crystal composition of zinc-cadmium-sulfide, which contains traces (of the magnitude of 1:10,000 and below) of the activators.

Copper as well as silver has already been incorporated in the zinc-cadmium-sulfide mixture, but each metal as such has been found not to give the best and most desirable results. In contradistinction thereto the presence of both copper and silver in the crystal mixture or mixed crystals has been found to give the favorable results indicated above, contrary to expectations, since hitherto it was universally believed that one activator would exert a disturbing effect on another one.

By varying the proportion between the zinc sulfide and the cadmium sulfide and/or between the silver and the copper addition, quite a number of luminescent compositions of different properties can be produced, which are more suitable for the purposes of television, than the preparations hitherto used.

*Example 1.*—730 grams purest zinc sulfide and 270 grams purest cadmium sulfide are mixed and the mixture reduced to a fine powder. To this powder are added 50 grams purest sodium chloride to which had been added 10 cubic centimetres of an alcoholic solution containing 0.1% nitrate of silver (calculated on the metal) and 4 cubic centimetres of an alcoholic solution containing 0.016% cupric chloride (calculated on copper metal) and which had been intimately mixed with the solutions and evaporated to dryness. After intimately mixing the sulfides with the sodium chloride thus prepared the mass is calcined by heating 1½ hours to 1000° C., thereby causing crystallization.

*Example 2.*—730 grams purest zinc sulfide and 270 grams purest cadmium sulfide were mixed and the mixture reduced to a fine powder. To this mixture were added 50 grams sodium chloride and 17 grams magnesium carbonate, to which had been added 15 cubic centimetres of a silver solution and 3 cubic centimetres of a copper solution, such as described with reference to Example 1, whereupon the salt had been subjected to evaporation to dry it. By carefully calcining the mixture during 1¾ hours at 900° C. crystallization of the mixture was obtained.

Example 3.—730 grams purest zinc sulfide and 270 grams purest cadmium sulfide were mixed and the mixture reduced to a fine powder. To this mixture were added 50 grams purest sodium chloride and 17 grams magnesium carbonate, to which had been added 5 cubic centimetres of a silver solution and 8 cubic centimetres of a copper solution such as described with reference to Example 1, whereupon the salt had been heated to evaporate to dryness. The mixture as a whole was then carefully heated for calcination to 1000° C. for 1½ hours to effect crystallization of the mixture.

The sepia tint of the shadows, the period of time during which the light remains visible, and the reddish tint of the light emitted are greater with the preparation of Example 2 and still greater with that of Example 3 than with the preparation first described.

An addition of magnesium carbonate is not indispensable, for this salt has no influence on luminescence as long as the quantities added are so small. However the magnesium carbonate will cause the formation of particularly minute crystals, which is most desirable in luminescent compositions.

By varying the percentage of cadmium in the mixture and the percentage of the solutions of copper and silver salts, the properties of the preparations can be varied within wide limits.

When using quartz crucibles for calcination I have found it useful to add some pure sulfur to the mixture.

Braun-tubes containing preparations according to the present invention have been found to be particularly efficient.

Various changes may be made in the details disclosed in the foregoing specification without departing from the invention or sacrificing the advantages thereof.

I claim:—

1. A luminescent composition yielding a daylight shade, comprising a mixture of approximately 73% zinc sulfide and approximately 27% cadmium sulfide, said mixture containing silver and copper compounds in amounts less than 0.01% of said sulfides.

2. A luminescent composition yielding a daylight shade, comprising a crystallized mixture of approximately 73% zinc sulfide and approximately 27% cadmium sulfide, said mixture containing silver and copper compounds in amounts less than 0.01% of said sulfides.

3. A luminescent composition yielding a daylight shade, comprising a calcined crystallized mixture of approximately 73% zinc sulfide and approximately 27% cadmium sulfide, said mixture containing silver and copper compounds in amounts less than 0.01% of said sulfides.

4. The method of producing a luminescent composition yielding a daylight shade, comprising preparing a mixture of approximately 73% zinc sulfide and approximately 27% cadmium sulfide, containing silver and copper compounds in amounts less than 0.01% of said sulfides, and a flux, and heating and calcining said mixture to effect crystallization thereof.

5. The method of producing a luminescent composition yielding a daylight shade, comprising calcining a mixture of approximately 73% zinc sulfide and approximately 27% cadmium sulfide so as to cause crystallization thereof, such mixture containing silver and copper compounds in amounts less than 0.01% of said sulfides.

ALFRED WAKENHUT.